(12) United States Patent
Rafferty et al.

(10) Patent No.: US 11,886,568 B2
(45) Date of Patent: *Jan. 30, 2024

(54) ACTIVE LOCKING MECHANISM USING MACHINE LEARNING

(71) Applicant: Capital One Services, LLC, McLean, VA (US)

(72) Inventors: Galen Rafferty, Mahomet, IL (US); Mark Watson, Sedona, AZ (US); Jeremy Goodsitt, Champaign, IL (US); Anh Truong, Champaign, IL (US); Austin Walters, Savoy, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,864

(22) Filed: Dec. 22, 2022

(65) Prior Publication Data
US 2023/0132099 A1 Apr. 27, 2023

Related U.S. Application Data

(63) Continuation of application No. 17/010,917, filed on Sep. 3, 2020, now Pat. No. 11,580,212, which is a
(Continued)

(51) Int. Cl.
*G06F 21/40* (2013.01)
*G06F 21/31* (2013.01)
(Continued)

(52) U.S. Cl.
CPC ............ *G06F 21/40* (2013.01); *G06F 21/316* (2013.01); *G06F 21/32* (2013.01); *G06F 21/36* (2013.01);
(Continued)

(58) Field of Classification Search
CPC ........ G06F 21/40; G06F 21/316; G06F 21/32; G06F 2221/2111; G06N 20/00
(Continued)

(56) References Cited

U.S. PATENT DOCUMENTS 8,718,608 B2 * 5/2014 Ding ...................... H04M 1/67
345/173
9,536,072 B2 * 1/2017 Guedalia ................ G06N 20/00
(Continued)

FOREIGN PATENT DOCUMENTS

CN 104428781 * 3/2015 ............. G06F 21/00

OTHER PUBLICATIONS

Xinyu Liu; Detecting Phone Theft Using Machine Learning; ACM:2018; p. 30-36.*
(Continued)

*Primary Examiner* — Monjur Rahim
(74) *Attorney, Agent, or Firm* — Banner & Witcoff, Ltd.

(57) ABSTRACT

Methods and systems disclosed herein describe using machine learning to lock and unlock a device. Machine learning may be trained to recognize one or more features. Once the device has been trained to recognize one or more features, a user may define an unlock condition for the device using the one or more trained features. After defining the unlock condition, the device may be locked by verifying the one or more features that the user defined as the unlock condition using machine learning. When verification is successful, the device may be unlocked and the user allowed to access the device.

26 Claims, 10 Drawing Sheets

Related U.S. Application Data continuation of application No. 16/671,290, filed on Nov. 1, 2019, now Pat. No. 10,795,984.

(51) Int. Cl.
  *G06F 21/32* (2013.01)
  *G06F 21/36* (2013.01)
  *G06F 21/60* (2013.01)
  *G06N 20/00* (2019.01)
  *G06N 5/04* (2023.01)

(52) U.S. Cl.
  CPC ............. *G06F 21/602* (2013.01); *G06N 5/04* (2013.01); *G06N 20/00* (2019.01); *G06F 2221/2111* (2013.01); *G06F 2221/2137* (2013.01)

(58) Field of Classification Search
  USPC .......................................................... 726/19
  See application file for complete search history.

(56) References Cited

U.S. PATENT DOCUMENTS

| | | |
|---|---|---|
| 10,795,984 B1 | 10/2020 | Rafferty et al. |
| 11,075,918 B2* | 7/2021 | Pereira ................. H04L 63/102 |
| 2011/0088086 A1 | 4/2011 | Swink et al. |
| 2012/0289201 A1* | 11/2012 | Ding ..................... H04W 12/08 455/411 |
| 2015/0326570 A1 | 11/2015 | Publicover et al. |
| 2015/0347734 A1* | 12/2015 | Beigi .................... H04L 9/3268 726/28 |
| 2016/0180068 A1* | 6/2016 | Das ..................... H04L 63/0861 726/7 |
| 2016/0180078 A1 | 6/2016 | Chhabra et al. |
| 2018/0069867 A1 | 3/2018 | Grajek et al. |
| 2019/0012441 A1* | 1/2019 | Tuli ........................ G06N 3/02 |
| 2019/0044942 A1* | 2/2019 | Gordon ............. H03M 13/3972 |

OTHER PUBLICATIONS

Ôabhilasha, "Privacy Preserving Multi-Factor Authentication with Biometrics" IEEE 2006.

* cited by examiner

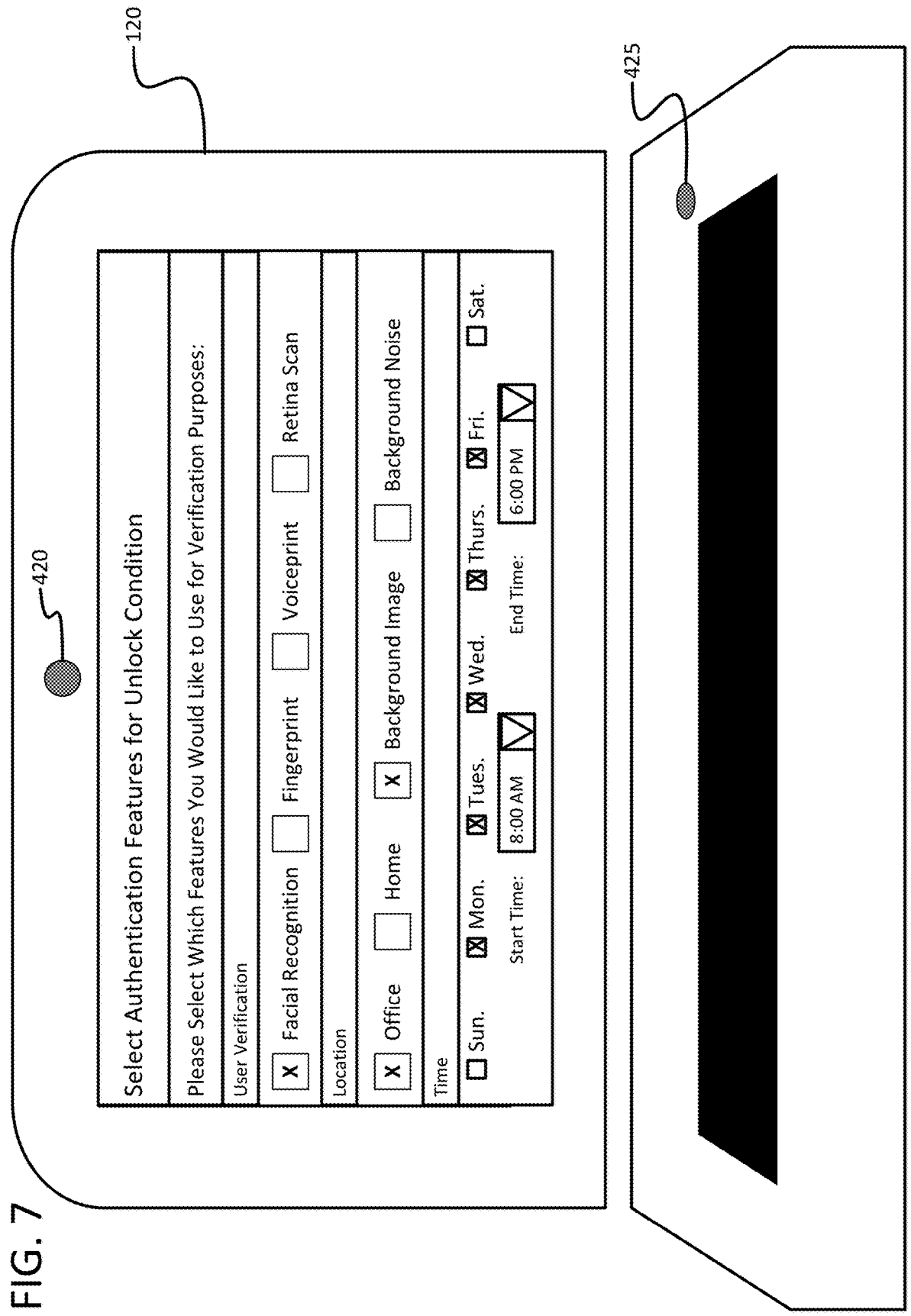

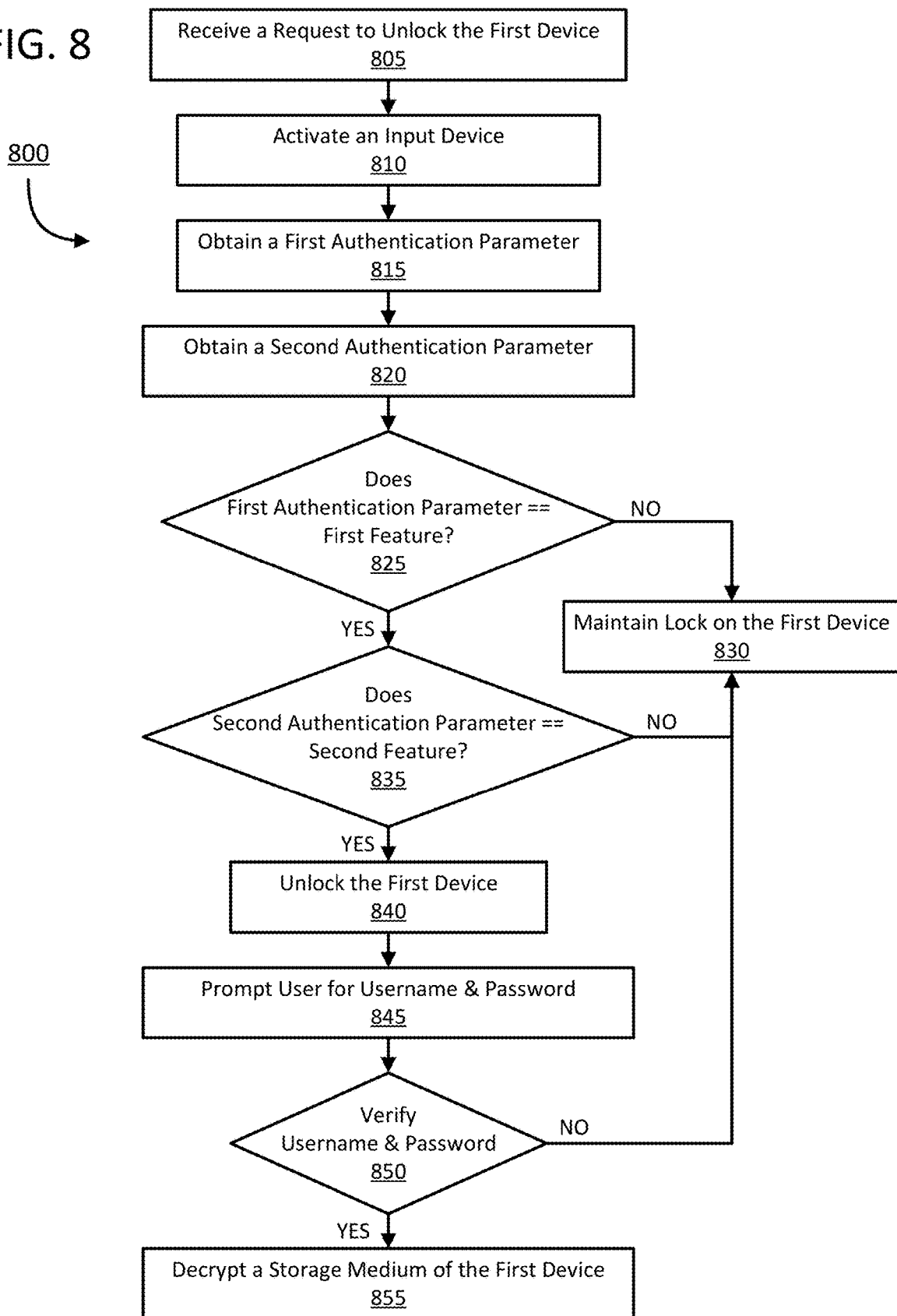

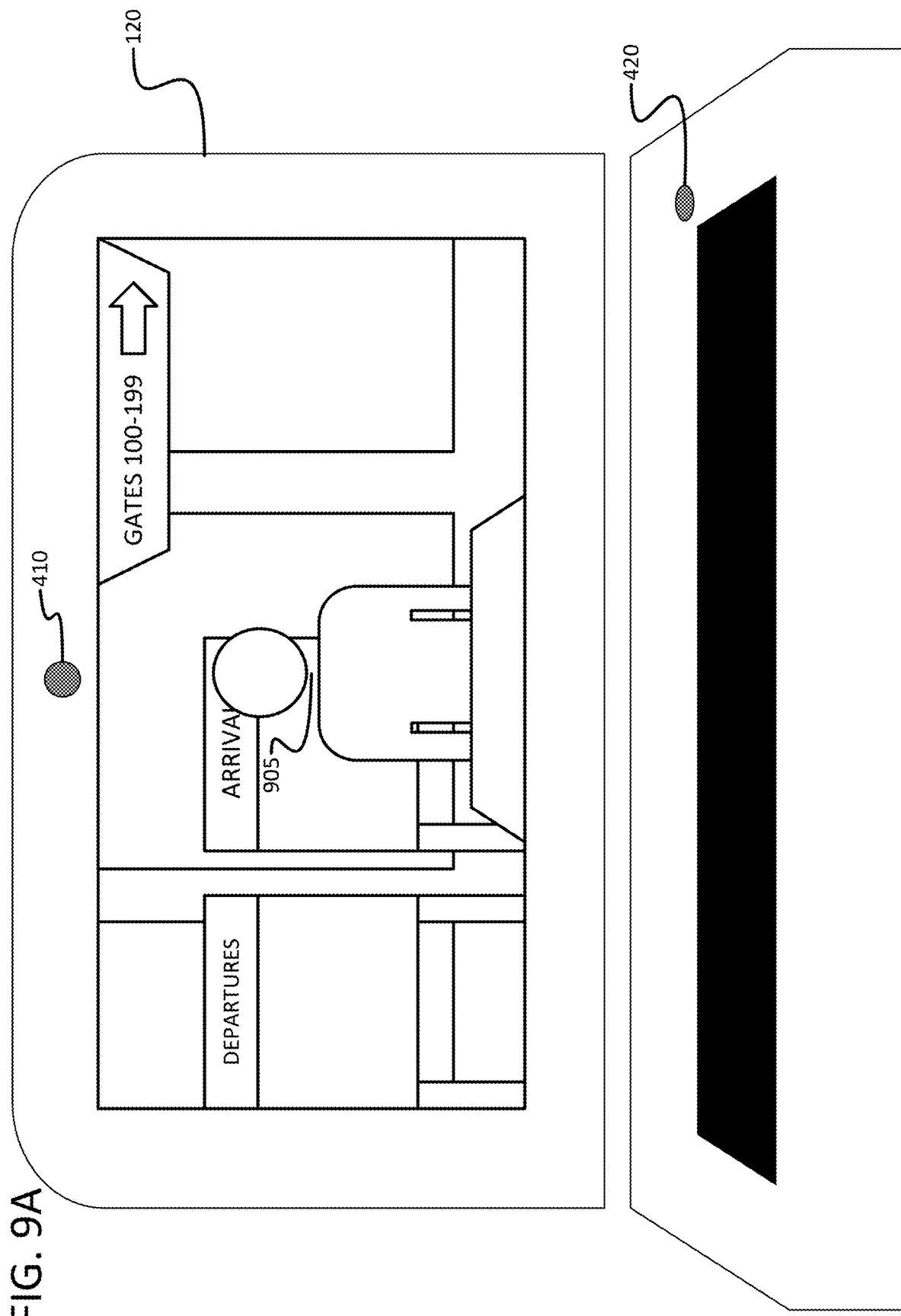

ACTIVE LOCKING MECHANISM USING MACHINE LEARNING

CROSS REFERENCE TO RELATED APPLICATIONS

This application is a continuation of U.S. application Ser. No. 17/010,917, filed on Sep. 3, 2020 and entitled "Active Locking Mechanism Using Machine Learning," which is a continuation of U.S. application Ser. No. 16/671,290 (now U.S. Pat. No. 10,795,984), filed on Nov. 1, 2019 and entitled "Active Locking Mechanism Using Machine Learning," the entireties of which are hereby incorporated by reference.

FIELD OF USE

Aspects of the disclosure relate generally to device security and, more specifically, to using machine learning to lock and unlock a device.

BACKGROUND

Devices may lock after a certain period of inactivity or in response to a user command This is especially true if the device contains highly-sensitive or confidential information. To unlock a device, a user may enter a personal identification number (PIN) or password. Alternatively, the user may unlock a device using a biometric identifier, such as a fingerprint or facial recognition. However, these traditional means of unlocking a device have their shortfalls. For instance, the user may be coerced, or otherwise compelled, to disclose their PIN and/or password. Alternatively, biometric identifiers may be publicly available and obtained without the user's permission. These biometric identifiers may then be used to unlock the user's device. Accordingly, there is a need to maintain a lock on a device even when a user may be coerced, or compelled, to unlock their device.

Aspects described herein may address these and other problems, and generally improve the efficiency and security of a device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems disclosed herein may using machine learning to lock and unlock a device. A device may include a machine learning-based locking application. The machine learning-based locking application may be trained to recognize one or more features. These features may include user features (e.g., facial recognition, fingerprint recognition, voice recognition, retina recognition, etc.), as well as environmental features (e.g., location, background images, ambient sounds, etc.). Once the machine learning-based locking application is capable of recognizing the trained user and environmental features, the user may be able to define an unlock condition for the device using one or more of the trained user and/or environmental features (e.g., conditions). In some instances, the user may also be able to set date and time restrictions as part of the unlocking condition. After defining the unlock condition, the device may be locked, for example, using the machine learning-based locking application.

To unlock the device, the unlock condition may have to be satisfied. Satisfying the unlock condition may include verifying the one or more features that the user defined as the unlock condition. This may include verifying one or more user features, environmental features (e.g., conditions), and/or time-based restrictions. When verification is successful, the machine learning-based locking application may unlock the device and allow the user to access the device. By using a machine learning-based locking application, device security may be improved, for example, by preventing a user from unlocking the device under duress or in response to being compelled to do so. Moreover, the machine learning-based locking application may prevent a thief from accessing the device, for example, if the device were stolen, since a thief would be unable to satisfy the unlock condition. Accordingly, the machine learning-based locking application improves the efficiency and security of locking a device.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 7 shows an example of defining an unlock condition according to one or more aspects of the disclosure;

FIG. 8 shows a flow chart of a process for unlocking the device according to one or more aspects of the disclosure; and FIGS. 9A and 9B show an example of failed unlock attempt according to one or more aspects of the disclosure.

DETAILED DESCRIPTION

Figure 1:
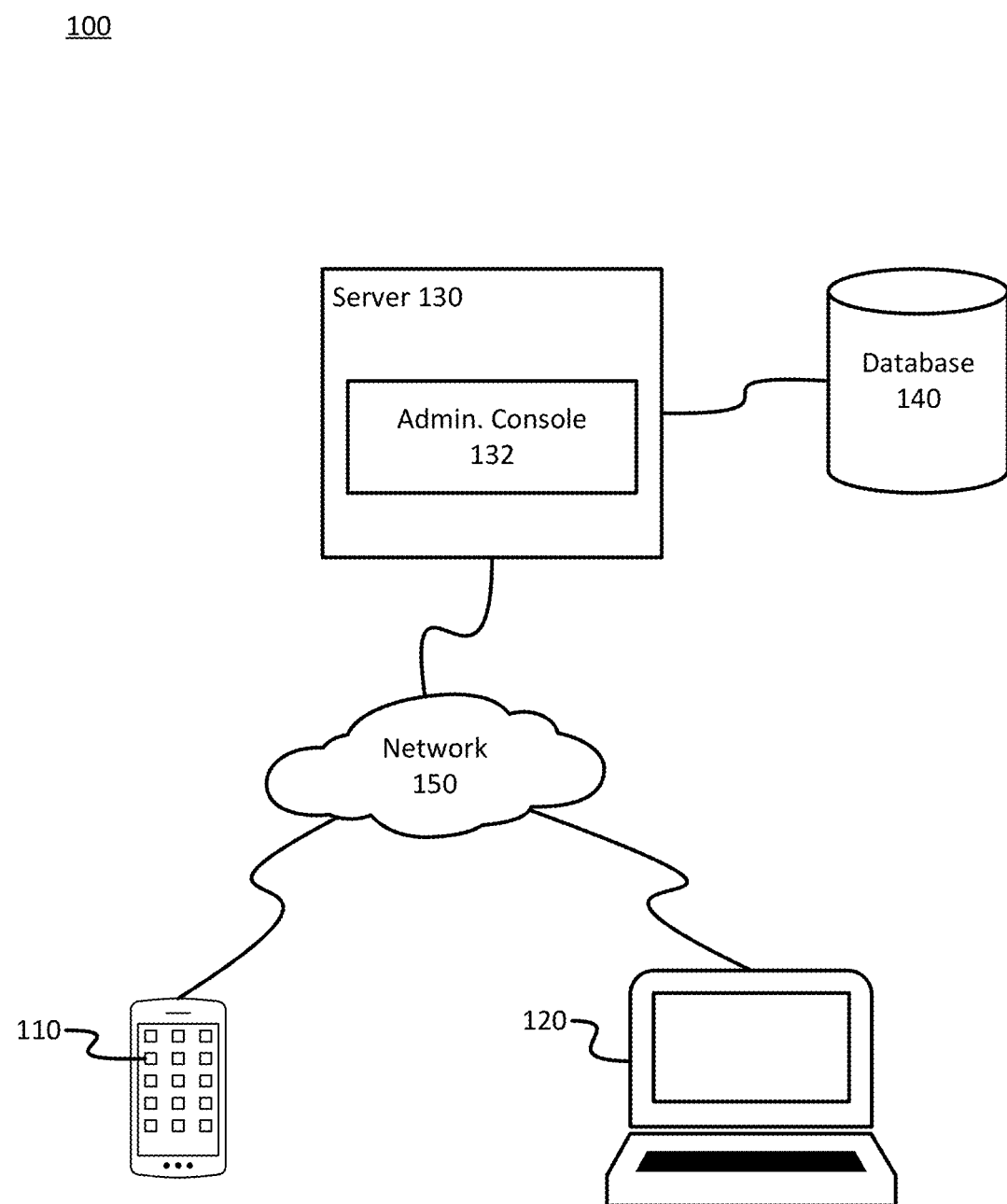
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for locking and unlocking a device using machine learning. A user may train a device to recognize one or more features using machine learning. The user may indicate (e.g., define) an unlock condition under which one or more of the trained features need to be verified before the device is unlocked. This represents an improvement over traditional password-based and biometric-based unlocking mechanisms, which may be susceptible to being cracked.

Methods and systems disclosed herein may using machine learning to lock and unlock a device. A device may include a machine learning-based locking application. The machine learning-based locking application may be trained to recognize one or more features. These features may include user features (e.g., facial recognition, fingerprint recognition, voice recognition, retina recognition, etc.), as well as environmental features (e.g., location, background images, ambient sounds, etc.). Once the machine learning-based locking application is capable of recognizing the trained user and environmental features (e.g., conditions), the user may be able to indicate (e.g., define) an unlock condition for the device using one or more of the trained user and/or environmental features (e.g., conditions). In some instances, the user may also be able to set date and time restrictions as part of the unlocking condition. After defining the unlock condition, the device may be locked, for example, using the machine learning-based locking application.

To unlock the device, the unlock condition may have to be satisfied. Satisfying the unlock condition may include verifying the one or more features that the user defined as the unlock condition. When verification is successful, the machine learning-based locking application may unlock the device and allow the user to access the device. By using a machine learning-based locking application, device security may be improved, for example, by preventing a user from unlocking the device under duress or in response to being compelled to do so. Moreover, the machine learning-based locking application may prevent a thief from accessing the device, for example, if the device were stolen, since a thief would be unable to satisfy the unlock condition. Accordingly, the machine learning-based locking application improves the efficiency and security of a device.

Turning to FIG. 1, a system 100 is shown that includes a first user device 110, a second user device 120, and a server 130, connected to a first database 140, interconnected via network 150.

First user device 110 may be a mobile device, such as a cellular phone, a mobile phone, a smart phone, a tablet, or a laptop. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include a locking application that uses machine learning to establish locking and unlocking conditions for first user device 110. The locking application may be obtained from an online retail store or a digital distribution service, such as iTunes® or Google Play®. Alternatively, the locking application may be installed by an administrator, for example, as part of a mobile device management (MDM) program. In some embodiments, the locking application may be a default locking mechanism on the device, installed by a manufacturer of the device or the developer of the device's operating system.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. In some embodiments, second user device 120 may include a locking application that uses machine learning to establish locking and unlocking conditions for first user device 110.

Server 130 may be any server capable of executing administrative console 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Administrative console 132 may be server-based software configured to provide an administrator (e.g., system administrator, network administrator) with management tools to administer a network. These tools may allow the administrator to remotely manage devices, add devices to the network, change passwords, reset passwords, provision new user accounts, de-provision user accounts, etc. In some instances, the administrative console 132 may allow an administrator to remotely lock a device. Alternatively, the administrative console 132 may allow an administrator to unlock a device, for example, when a user forgets their password or unlock conditions. In this regard, an administrator may adhere to certain policies when unlocking a user's device. For example, the administrator may unlock the device in accordance with the two-man rule or, alternatively, the three-man rule.

First database 140 may be configured to store information on behalf of administrative console 132. According to some embodiments, first database 140 may be a database or table configured to provide directory services, for example, using Lightweight Directory Access Protocol (LDAP), Active Directory, or an equivalent directory service. For instance, first database 140 may include a corporate directory that comprises employees' information, such as the employees' first and last names, usernames, email addresses, phone numbers, department information, etc. In some embodiments, first database 140 may be encrypted to protect the information contained therein. First database 140 may include, but are not limited to relational databases, hierarchical databases, distributed databases, in-memory databases, flat file databases, XML databases, NoSQL databases, graph databases, and/or a combination thereof.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
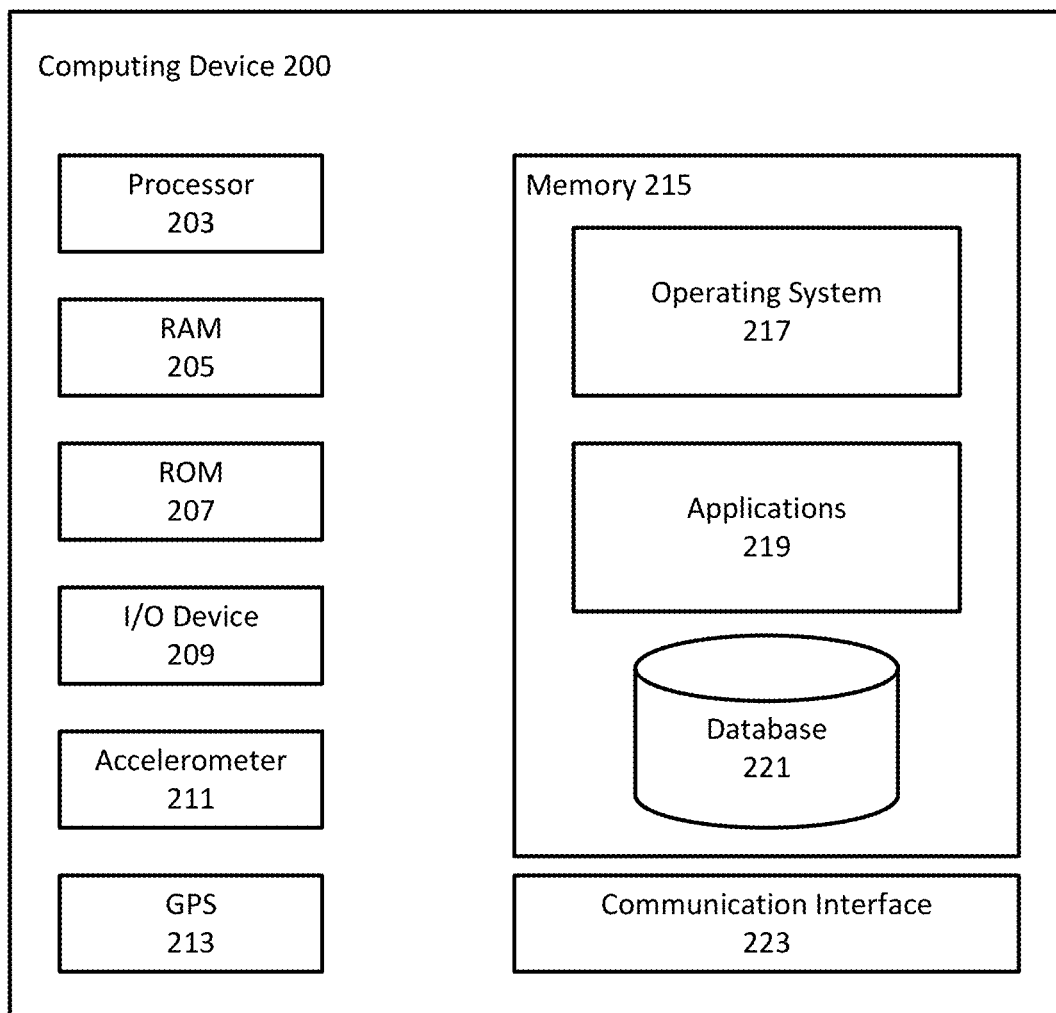
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. In some embodiments, I/O device 209 may include an image capture device, such as a camera. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer 211 may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user. In the context of a locking application, GPS receiver/antenna 213 may be used to locate the computing device 200 to determine whether a current location is a location that satisfies an unlock condition. In some embodiments, GPS receiver/antenna 213 may be used to determine the orientation of a device (e.g., facing north), as part of determining whether an unlock condition is satisfied.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
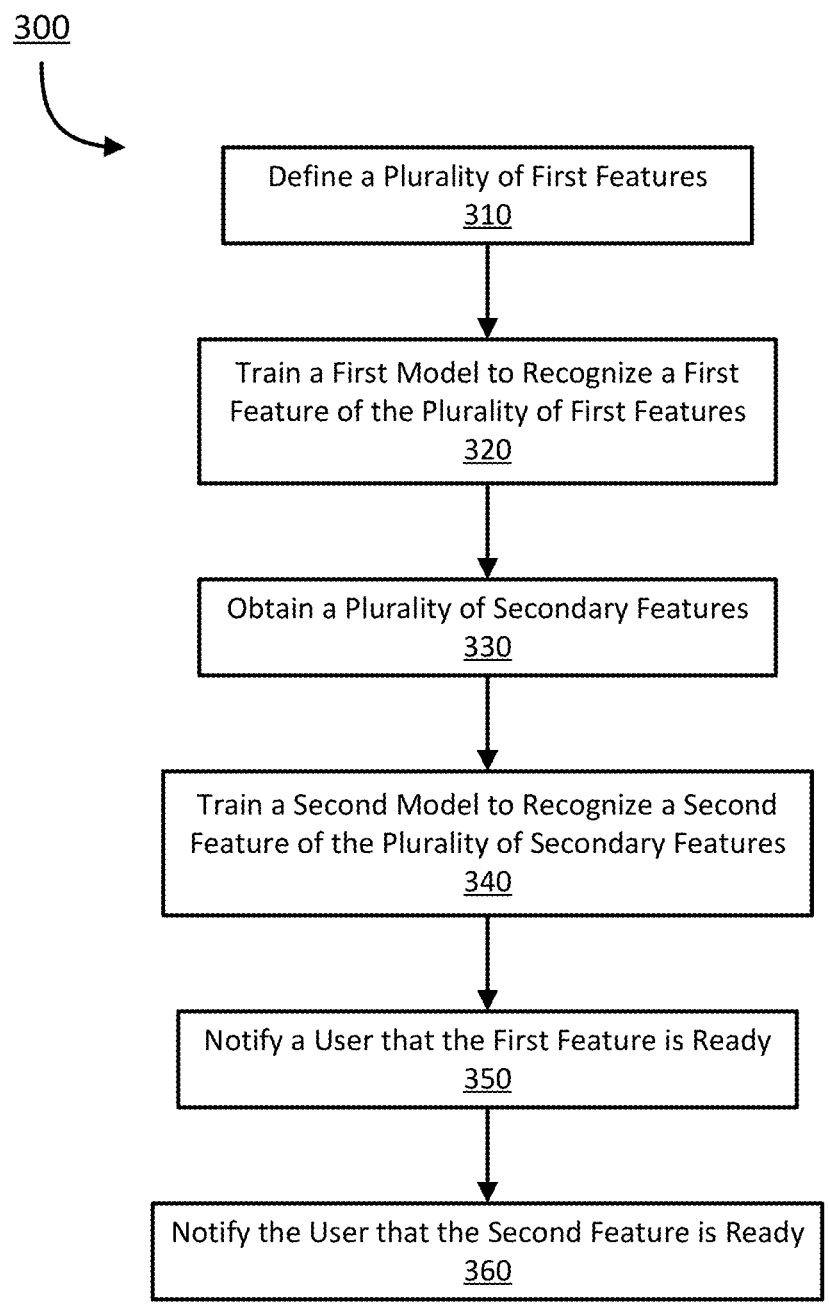
FIG. 3 shows a flow chart of a process for training a machine learning model to recognize one or more user features according to one or more aspects of the disclosure.

Users may wish to indicate (e.g., define) a lock condition under which a device may not be unlocked, even if the user were coerced, or otherwise compelled, to provide their username and password. For instance, a user travelling internationally with a device that contains confidential, or other highly sensitive information, may not want the device to be unlocked until he/she reaches his/her destination. The user may implement the machine learning-based locking techniques described herein to ensure that the device remains locked until the user arrives at his/her destination. In order to effectuate the lock, the user may have to configure the machine learning-based locking application to recognize one or more user features. FIG. 3 shows a flow chart of a process for training a machine learning model to recognize one or more user features according to one or more aspects of the disclosure. Some or all of the steps of process 300 may be performed using one or more computing devices as described herein.

As discussed above, the user may obtain the machine learning-based locking mechanism from an online retail store or a digital distribution service or from an administrator as part of a mobile device management (MDM) program. In order to make use of the machine learning-based locking mechanism, the user may have to configure the locking application to recognize one or more of the user's features. In step 310, a user may indicate (e.g., define) a plurality of first features for the locking application to recognize. The plurality of first features may include user features, such as a biometric identifier (e.g., facial recognition, voiceprint, retina scan, fingerprint, etc.). In some instances, the biometric identifier may be further defined to be unique to a user. For example, the user may make a silly face as part of the facial recognition. Alternatively, the facial recognition may be from a unique perspective, such as a profile or from below. In another example, the user may define the voiceprint to be a funny word or a unique noise. Additionally, or alternatively, the plurality of first features may include environmental features, such as a background image, such as the user's home, the user's office, etc. In some instances, the background image may be associated with a location. In this regard, the plurality of first features may include one or more images associated with a location determined by the device's GPS antenna/receiver.

After the user defines a plurality of first features, the user device (e.g., the locking application executing on the user device) may train a first machine learning model to recognize a first feature of the plurality of features in step 320. In some example embodiments, the user device may extract one or more features from an image using a feature extraction technique, such as scale-invariant feature transform (SIFT), speeded-up robust features (SURF), or an equivalent thereof. The one or more extracted features may then be provided to a machine learning model such that the machine learning model can be trained to recognize the one or more extracted features. The first machine learning model may a support vector machine, logistic regression, random forest, or an equivalent thereof. Additionally, or alternatively, the machine learning model may be a convolutional neural network, a recurrent neural network, a recursive neural network, a long short-term memory (LSTM), a gated recurrent unit (GRU), an unsupervised pre-trained network, a space invariant artificial neural network, or any equivalent thereof. In some embodiments, the first machine learning model may be an existing machine learning model. In further embodiments, the first machine learning model may be a proprietary model. Alternatively, the first machine learning model may be a modified existing machine learning model such that the first machine learning model becomes proprietary. In some instances, the first machine learning model may be trained using different parameters, such as back propagation, transfer learning, stochastic gradient descent, learning rate decay, dropout, max pooling, batch normalization, long short-term memory, skip-gram, and/or any equivalent deep learning technique. According to some embodiments, the first machine learning model may generate a first baseline feature vector for the first feature. The first baseline feature vector may be used for verification purposes (e.g., as the verified feature to which subsequent verification attempts may be compared). In practice, the user device (e.g., the locking application executing on the user device) may obtain samples of the first feature from the user until the user device is able to recognize the first feature. These samples may be provided as part of an enrollment process. For example, the user device may prompt the user to repeat a passphrase or passcode. The microphone may record the user's voice until the user device is able to recognize the user's voice as part of a voiceprint authentication. Alternatively, these samples may be obtained in a more passive way. For instance, the user device (e.g., the locking application on the user device) may obtain a picture of the user from a forward-facing camera each time the user logs in to the device or while the user is working at the device.

While the first model is being trained to recognize the first feature, the user device may obtain a plurality of secondary features in step 320. The plurality of secondary features may include a plurality of user features and environmental features. The secondary features may include latent features in the plurality of first features as determined by the first machine learning model during the training of the first machine learning model to identify the first features. In some embodiments, the secondary features may include ambient sounds. The ambient sounds may be received by the microphone while recording the user's voice. The ambient sounds may include a variety of noises, such as, street noise, radio sounds, phones ringing, typing tempo, or any other typical office noise. In some instances, the secondary features may include one or more background features. The forward facing camera may obtain one or more features of the user's background when training the facial recognition feature. As will be discussed in greater detail below with respect to FIG. 4, the one or more background features may be associated with a particular location (e.g., the user's home or office). In this regard, the camera may obtain the user's desk, a wall-mounted photo, a window, a tree outside the window, or any other features that may be typically found in a user's home or office. The plurality of secondary features may be transferred to a second model for transfer learning purposes.

In step 340, the user device may train a second model to recognize a second feature of the plurality of secondary features. In some embodiments, the second model may be the same as the first model. In a variety of embodiments, the second model may be different from the first model. Further, the second model may be trained in a manner similar to the techniques described above with respect to step 320. The second feature may be obtained in the same manner as the first feature. For example, the second feature may be obtained by the forward facing camera while obtaining images of the user for facial recognition authentication. Similarly, the second feature may be obtained by the microphone while obtaining one or more sounds to authenticate the user. In some embodiments, the second machine learning model may generate a second baseline feature vector for the second feature, which may be used for subsequent verification attempts.

In step 350, the user device (e.g., the locking application executing on the user device) may notify the user that the first feature is ready to be used as an unlocking condition. Similarly, the user device may notify the user that the second feature is ready to be used as an unlocking condition in step 360. In both instances, the user device (e.g., the locking application executing on the user device) may provide an indication to the user that the first model and the second model have been trained to recognize the first feature and the second feature, respectively. These notifications may be provided at the completion of an enrollment process. Alternatively, the user device (e.g., the locking application executing on the user device) may be passively obtaining the first feature and the second feature from the user. That is, the user device may obtain samples from the user throughout the day, or over the course of several days, as the device is used. In this context, the user device (e.g., the locking application executing on the user device) may provide an electronic notification, such as a push notification, a text message, an e-mail, or any equivalent thereof to indicate that the first feature and the second feature are ready to be used as authentication parameters.

Figure 4:
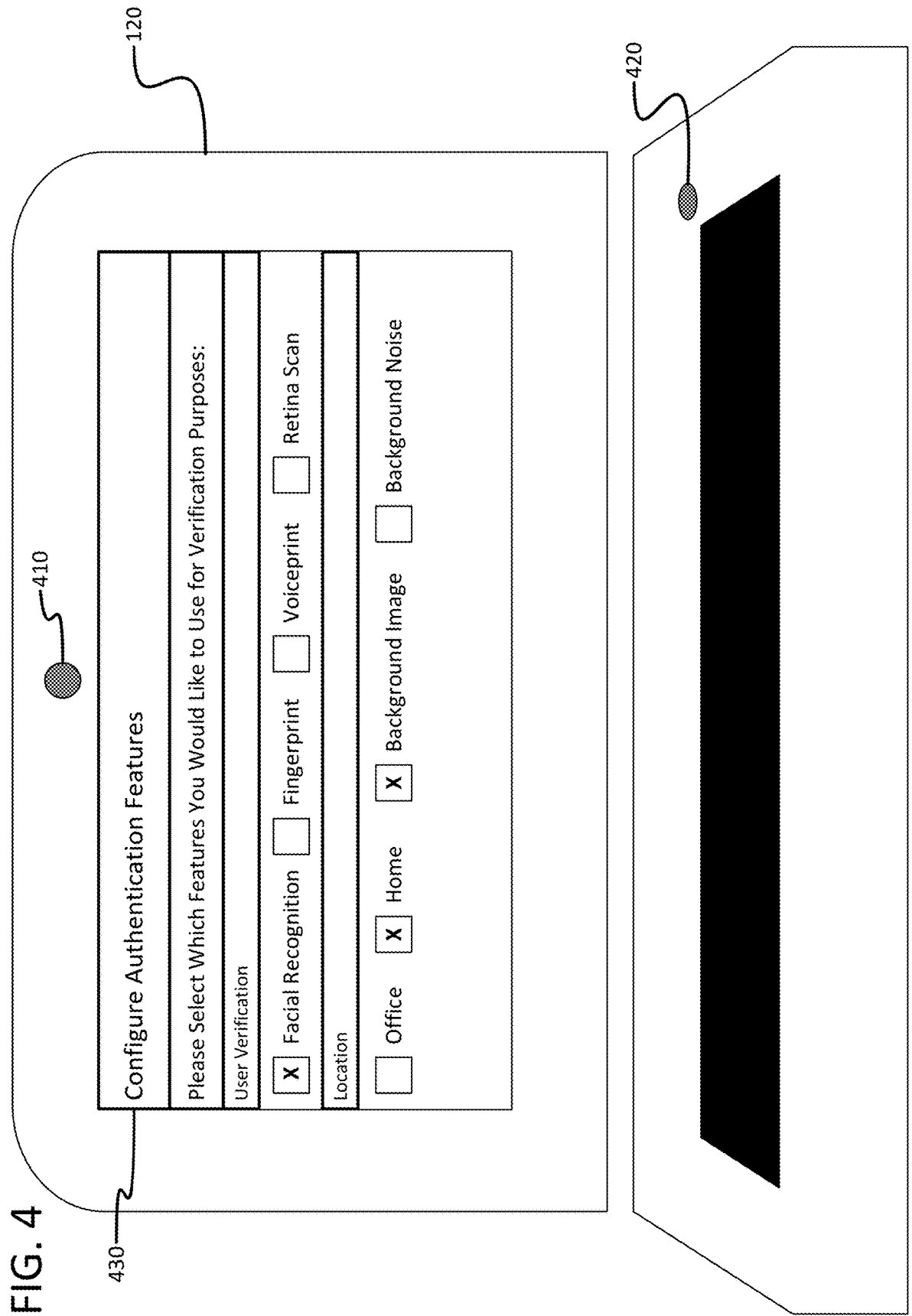
FIG. 4 shows an example of configuring a locking mechanism with one or more authentication features according to one or more aspects of the disclosure.

As discussed above, a user may select one or more features that the user would like to use for verification (e.g., authentication) purposes that would unlock the device. FIG. 4 shows an example of configuring a locking mechanism with one or more authentication features according to one or more aspects of the disclosure.

FIG. 4 illustrates second user device 120 comprising a camera 410, a microphone 420, and a display 430. As noted above, the camera 410 may be used to obtain one or more authentication features (e.g., facial recognition, background images and/or features). Similarly, the microphone 420 may be used to obtain one or more authentication features (e.g., voiceprint, ambient sounds, etc.). The display 430 may be any display capable of presenting a configuration screen. The configuration screen may allow a user to indicate (e.g., define) one or more authentication features that may be used to subsequently unlock the second user device 120. As illustrated, the configuration screen may allow the user to select one or more features for user verification, such as facial recognition, fingerprint authentication, voiceprint authentication, or a retina scan. A user may select one or more of these features, after which the second device 120 may obtain one or more samples associated with the selected feature to train a machine learning model to recognize the selected feature. As illustrated, a user has selected facial recognition. Accordingly, second device 120 may obtain sample images of the user's face using the camera 410. FIG. 4 also shows that the user may define location as an authentication feature. In this sense, second device 120 may obtain sample images of the user's background and associate the sample images with the user's home. In some embodiments, images of the user's background may be associated with a geographic location determined using location services on the second device 120. The location services may include GPS. Alternatively, the location services may include an indoor location service, for example, that determines the user's location indoors using the roundtrip time from the user's device to a base station. In some instances, the second device 120 may use a combination of GPS and the indoor location service.

Figure 5:
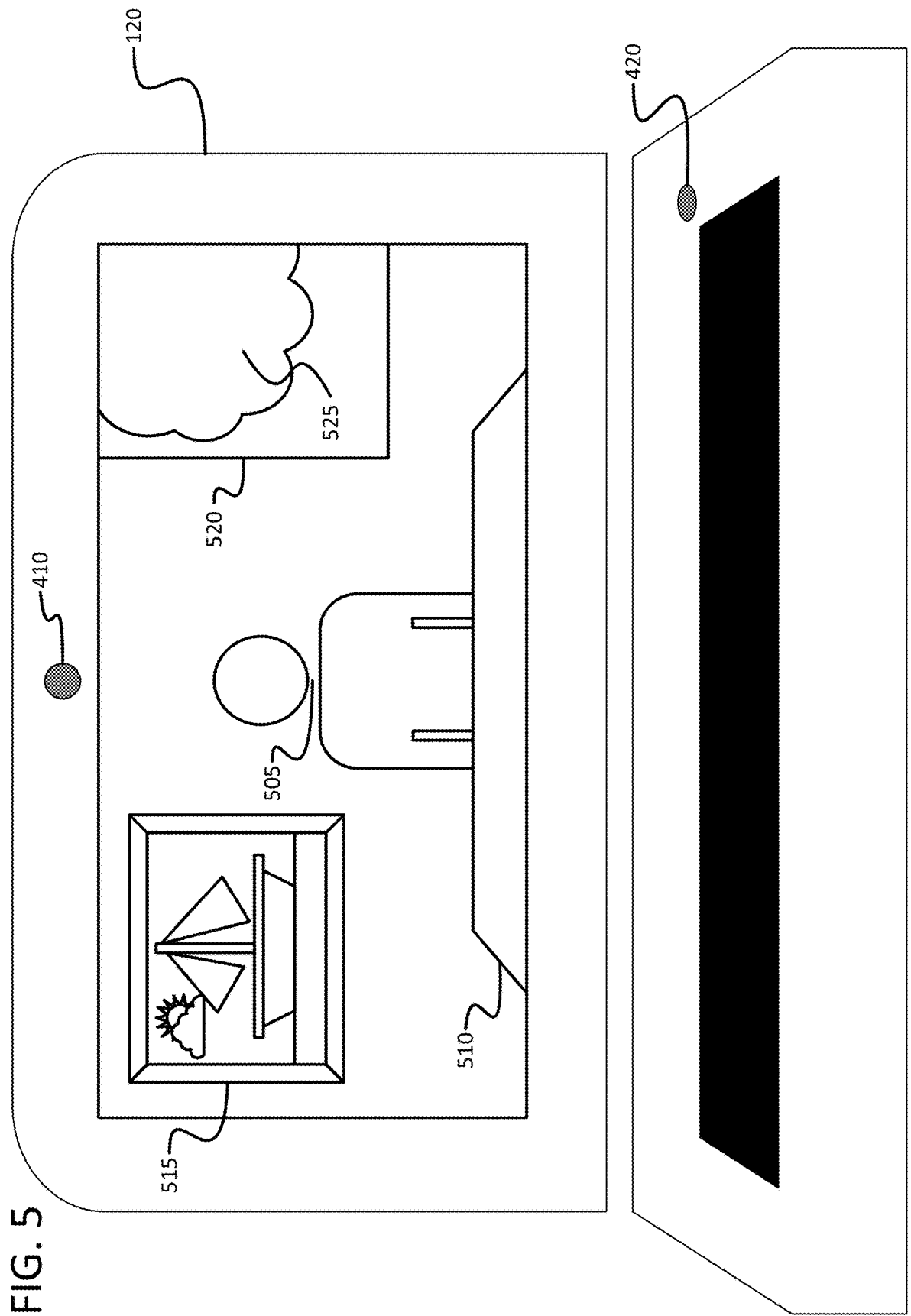
FIG. 5 shows an example of training the locking mechanism to recognize one or more user features according to one or more aspects of the disclosure.

In response to selecting one or more authentication features to train, a user device may activate one or more input devices (e.g., camera or microphone) to obtain samples of the selected features to train the machine learning model. FIG. 5 shows an example of training the locking mechanism to recognize one or more user features according to one or more aspects of the disclosure.

FIG. 5 continues the example discussed above in FIG. 4. The user has selected to train the second user device 120 to recognize the user's face and the background image of the user's home. The second user device 120 may activate the camera 410 to obtain samples of the user and the user's home. FIG. 5 shows that the second user device 120 may recognize the user 505. In addition to user 505, the second user device 120 may also recognize a desk 510, a picture 515, a window 520, and a tree 525. As discussed above, the second user device 120 may obtain the image presented in FIG. 5 as part of an enrollment process. Alternatively, the second user device 120 may obtain the image of FIG. 5 passively, for example, by capturing images of the user when the second user device 120 determines that the user 505 is using the second user device 120. It will be appreciated that the second user device 120 may not display the image depicted in FIG. 5 as part of the training process. Instead, the second user device 120 may allow the user to perform tasks while the second user device 120 may learn to recognize the user's face and the features in the background of the user's home. During the training process, the second user device 120 may separate the user's face from the background image. In this regard, the face learned during the training at the user's home may be used to authenticate the user at the office and other locations. Similarly, the background image of the user's home, and the features contained therein (e.g., desk 510, picture 515, window 520, and tree 525) may be associated with the user's home. Accordingly, when the user later defines the unlock condition to include the user's home, the second user device 120 may search for desk 510, picture 515, window 520, and tree 525. As will be discussed in greater detail below, once the model is trained to recognize the background image of the user's home, the second user device 120 may unlock the device, for example, based on the second user device 120 detecting desk 510, picture 515, window 520, and tree 525 in the user's background.

Figure 6:
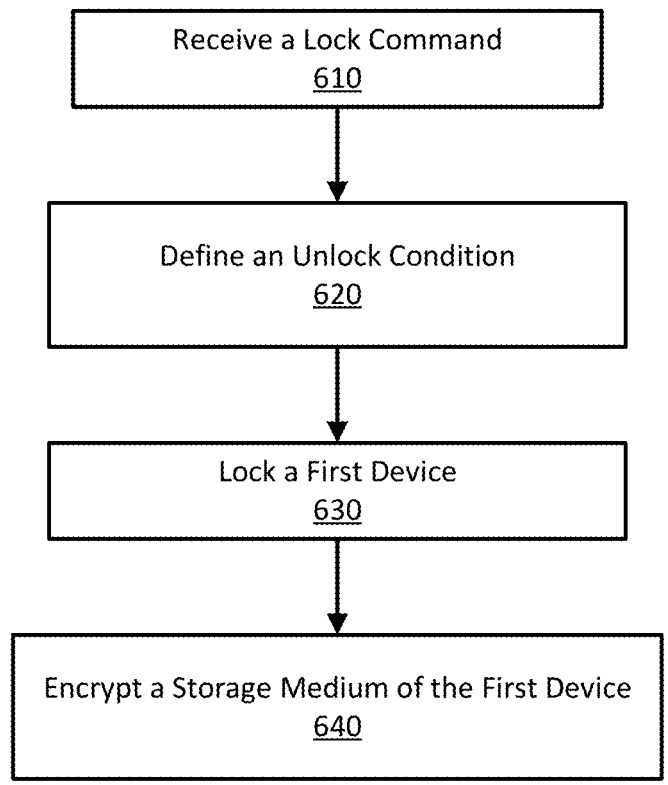
FIG. 6 shows a flow chart of a process for locking a device according to one or more aspects of the disclosure.

After the model has been trained to recognize one or more of the features defined by the user, the user may set an unlock condition that includes the one or more features capable of being recognized by the locking application. FIG. 6 shows a flow chart of a process for locking a device according to one or more aspects of the disclosure. Some or all of the steps of process 600 may be performed using one or more computing devices as described herein.

In step 610, the first user device may receive a lock command. In some instances, the lock command may be received by the operating system executing on the first user device. In a variety of embodiments, the lock command may be received by a locking application executing on the first device.

In step 620, the first user device may prompt a first user to indicate (e.g., define) an unlock condition. To define the unlock condition, the user may select one or more features to be verified. When the one or more features are verified, the locking application may unlock the first user device. However, when the one or more features are not verified, the locking application may maintain the lock on the first user device. As noted above, the one or more features may be selected from facial recognition, fingerprint authentication, voiceprint authentication, retina scan, a location (e.g., home or office), a background image, ambient sounds, or any combination thereof.

In step 630, the first user device may be locked. As discussed above, the locking mechanism may be a default lock provided by the manufacturer of the device or the developer of the device's operating system. Alternatively, the locking mechanism may be an application downloaded and installed on the first user device by the user. In some instances, the locking mechanism may be installed on the first user device by an administrator of the user's work network as part of an MDM solution.

In step 640, the first user device (e.g., the locking mechanism executing on the first device) may encrypt a storage medium of the first device. The storage medium may be the main memory of the first user device. In this regard, the storage medium may be any suitable memory, such as a hard disk drive or a solid state drive. The locking mechanism may derive an encryption key, to encrypt the storage medium, based on the one or more features selected as the unlock condition. Alternatively, the encryption key may be a pseudorandom string of characters generated using a pseudorandom number generator. The locking mechanism may use the derived encryption key and an encryption algorithm to encrypt the storage medium.

Turning to FIG. 7, an example of defining an unlock condition according to one or more aspects of the disclosure is shown. FIG. 7 shows the second user device 120, which includes camera 410, microphone 420, and display 430. The display 430 may show a screen that allows a user to indicate (e.g., define) an unlock condition. The unlock condition may be selected from a variety of factors. For example, the unlock condition may verify the user using facial recognition, fingerprint recognition, a voiceprint, a retina scan, or any combination thereof. Additionally, or alternatively, the unlock condition may verify the location of the first device. The location may be verified using location services (e.g., GPS), a background image, background noise (e.g. ambient sounds), or any combination thereof. In another example, the unlock condition may set a timeframe on when the second device 120 may be unlocked. For instance, certain dates and/or times may be selected during which the second device 120 may be unlocked. It will be appreciated that the examples provided above are merely illustrative, and any equivalents may be used in place of the examples described above.

Furthermore, it should be recognized that any combination or permutation of features may be combined to define the unlock condition. In some embodiments, some features do not have a baseline feature vector established may be ineligible for the unlock condition. These features may be grayed out, or otherwise unavailable for the user's selection. In further embodiments, the unlock condition may be set by a system administrator and a notification may be provided as to the features required to satisfy the unlock condition.

In the example shown in FIG. 7, the user has selected facial recognition, an office location, a background image, and a time restriction as an unlock condition. Accordingly, to satisfy the unlock condition and unlock the second device 120, the user may have to provide an image that includes the user's face and office background, the location services of second device 120 may have to detect that the device is located at the user's office, and the attempt to unlock may have to be between the times defined by the user (e.g., Monday through Friday, between 8:00 am and 6:00 pm). By defining locking conditions in this way, a thief may not be able to access a stolen locked device because the thief will not be able to satisfy the unlock condition. Furthermore, coercion may not unlock the device. In this regard, the locking mechanism may detect that the user is in poor health or under duress and maintain the lock condition to protect the sensitive or confidential information contained on the second device 120.

After defining a locking condition, the user may gain access to their device by satisfying the defined unlock condition. FIG. 8 shows a flow chart of a process for unlocking the device according to one or more aspects of the disclosure. Some or all of the steps of process 800 may be performed using one or more computing devices as described herein.

In step 805, the first device (e.g., the locking application) may receive a request to unlock the first device. In step 810, the first device may activate one or more input devices (e.g., camera, microphone, location services, fingerprint scanner, retina scanner, etc.). Activation of the one or more input devices may be based on, or in response to, the request to unlock the first device. In some instances, the first device may be passively monitoring the device's environment. In this regard, the one or more input devices may be constantly monitoring. Alternatively, the one or more input devices may be intermittently monitoring to determine whether the unlock conditions have been satisfied.

In step 815, the first device (e.g., the locking application executing on the first device) may obtain a first authentication parameter. The first authentication parameter may be obtained using the one or more input devices. In step 820, the first device (e.g., the locking application executing on the first device) may obtain a second authentication parameter. Much like the first authentication parameter, the second authentication parameter may be obtained using the one or more input devices. In step 825, the first device may determine whether the first authentication parameter matches a first feature defined as part of the unlock condition. Determining whether the first authentication parameter matches the first feature may comprise generating a first feature vector from the first authentication parameter. The first feature vector may be generated using any of the machine learning models or neural networks described above. The first feature vector may then be compared to a first baseline feature vector of the first feature. When the first feature vector does not match the first baseline feature vector, the lock on the first device may be maintained in step 830. However, when the first authentication parameter matches the first feature, process 800 may proceed to step 835 to verify one or more second authentication parameters.

In step 835, the first device may determine whether the second authentication parameter matches a second feature defined as part of the unlock condition. Much like authenticating the first authentication parameter, the first device may generate a second feature vector from the second authentication parameter. The second feature vector may then be compared to a second baseline feature vector of the second feature. When the second feature vector does not match the second baseline feature vector, the lock on the first device may be maintained in step 830.

When the second authentication parameter matches the second feature, the first device may be unlocked in step 840. Unlocking the device may comprise transitioning from a locked screen to an unlocked screen or a graphical user interface (e.g., desktop). In some embodiments, the first device may prompt the user for a username and password in step 845. This may be a precautionary measure that provides an additional layer of security. In response to receiving the user's username and password, the first device may verify the received username and password in step 850. This may include comparing the received username and password to a stored username and password. If the received username and password are not verified, process 800 may return to step 830 and the first device may maintain the lock on the first device. When the received username and password are verified, the first device may transition from a locked screen to an unlocked screen or a graphical user interface (e.g., desktop). In step 855, the first device may decrypt a storage medium. As noted above, the first device (e.g., the locking application executing on the first device) may derive the encryption key, used to decrypt the storage medium, using the one or more features obtained as part of the unlocking condition. For example, the first authentication parameter and the second authentication parameter may be used to derive the encryption key to decrypt the storage medium.

It will be appreciated that the techniques described above for unlocking the first device may occur in a different sequence. Further, certain steps may be skipped or omitted. For example, the password verification described in steps 845 and 850 may be skipped or omitted entirely. Furthermore, it will be appreciated that a user may define one feature as an unlock condition. In these instances, step 835 may be skipped or omitted. Similarly, the user may define more than two features for authentication purposes. Accordingly, steps 825 and 835 may be repeated until each of the features defined as an unlock condition have been authenticated.

Figure 9B:
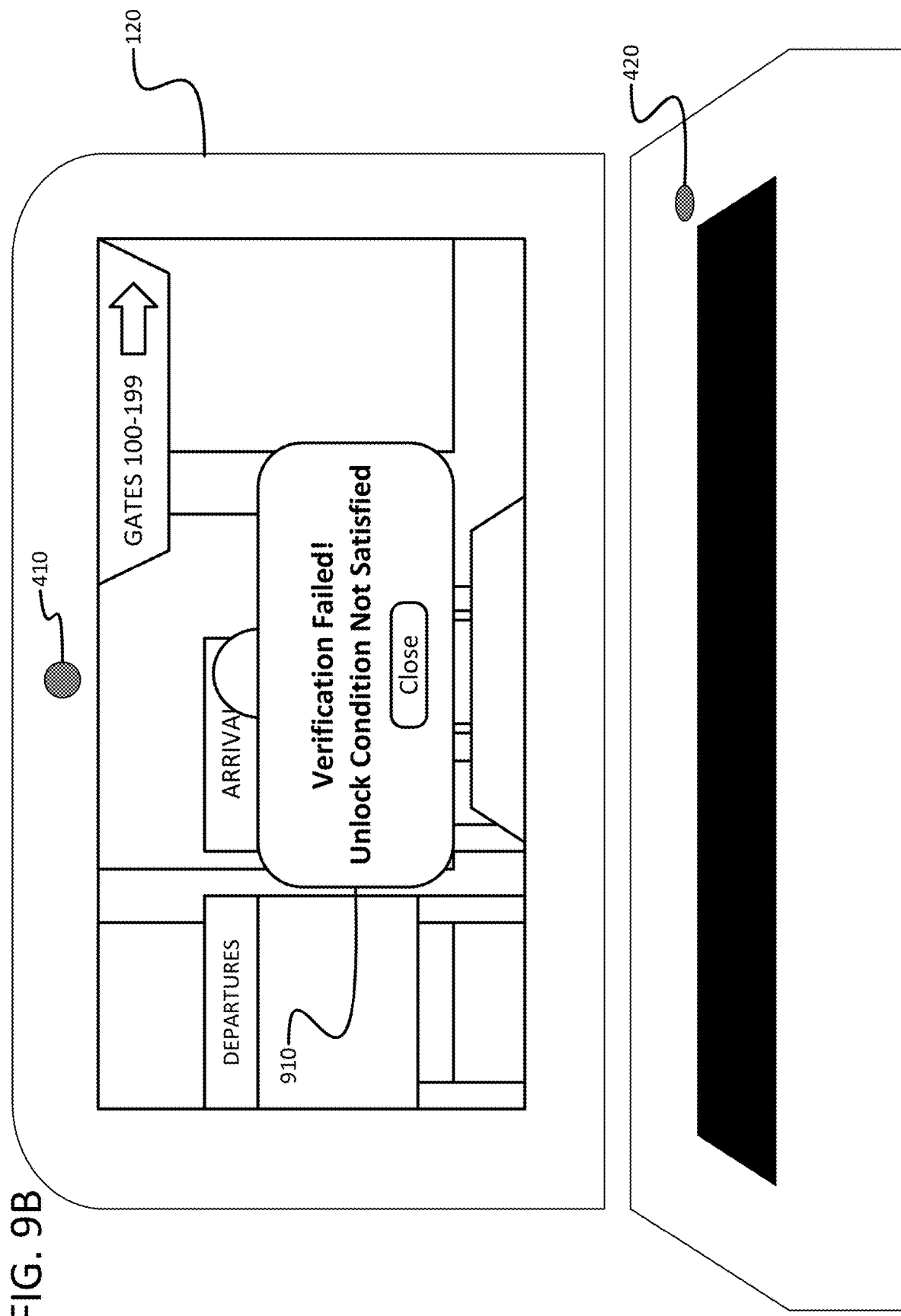

Unlocking conditions may be recognized as reproducing the conditions at locations that were deemed secure at the time the locking application was trained to recognize one or more user features. However, users may travel with their devices. During their travels, the user may be asked to unlock their device, for example, when travelling through airport security. FIGS. 9A and 9B show an example of a failed unlock attempt according to one or more aspects of the disclosure.

FIG. 9A illustrates second device 120. A user may be travelling through airport security, during which time, the user may be asked to unlock their device. When the user has locked their device according to the techniques described herein, the user may be unable to unlock their device. For instance, the user may have set a plurality of features discussed above as part of the unlock condition. Accordingly, in response to a request to unlock the device, the user may attempt to unlock the second device 120. The second device 120 (e.g. locking application) may recognize user 905, for example, using camera 410. However, the second device 120 may not recognize the background image detected by camera 410. Similarly, the location of the second device 120 may not be associated with the user's home or office. Accordingly, the second user device 120 may not recognize the location provided by the location services located on the second user device 120. Further, the second user device 120 may recognize a voiceprint provided by user 905; however, the second user device 120 may not recognize one or more ambient sounds. Regardless of whether the second user device 120 fails to recognize the background image, the location of the second device 120, and/or the ambient noises, the second user device 120 may maintain the lock condition on the second user device 120 since all of the unlock conditions have not been satisfied. Accordingly, a verification failed message 910 may be displayed on the second user device 120, as shown in FIG. 9B. The locking application may prevent unauthorized access to the device if one or more unlock conditions are not satisfied, even if the user is verified. The user may surrender their device to airport security as a result of being unable to unlock their device. However, the user (and their company) may be assured that the information contained therein has not been compromised or breached.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device comprising:
   one or more processors; and
   memory storing instructions that, when executed by the one or more processors, cause the computing device to:
      receive a request to unlock a portion of the computing device's capabilities;

receive, via one or more inputs of the computing device, a first authentication parameter and a second authentication parameter, wherein the second authentication parameter comprises a background element;

determine, using a first machine learning model trained to identify a first baseline parameter associated with a lock condition, that the first authentication parameter matches the first baseline parameter;

determine, using the first machine learning model, a physical state of a user requesting unlocking of the portion of the computing device's capabilities;

determine, using a second machine learning model trained to identify a second baseline parameter associated with the lock condition, that the second authentication parameter matches the second baseline parameter;

determine, based on the physical state of the user, based on the first authentication parameter matching the first baseline parameter, and based on the second authentication parameter matching the second baseline parameter, that an unlock condition has been satisfied; and unlock, based on a determination that the unlock condition has been satisfied, the portion of the computing device's capabilities.

2. The computing device of claim 1, wherein the instructions, when executed by the one or more processors, cause the computing device to:
decrypt a storage medium associated with the computing device.

3. The computing device of claim 1, wherein the first authentication parameter comprises a biometric identifier.

4. The computing device of claim 3, wherein the background element comprises at least one of:
a background associated with a location;
a background image;
an ambient sound; or
an orientation of the computing device.

5. The computing device of claim 1, wherein the instructions, when executed by the one or more processors, cause the computing device to:
receive a lock command, wherein the lock command comprises a definition of the unlock condition.

6. The computing device of claim 1, wherein the instructions, when executed by the one or more processors, cause the computing device to:
determine that a first geographic location of the computing device corresponds to a second geographic location defined in the unlock condition.

7. The computing device of claim 1, wherein the instructions, when executed by the one or more processors, cause the computing device to determine that the unlock condition has been satisfied by determining that a current time corresponds to a time range defined in the unlock condition.

8. The computing device of claim 1, wherein the instructions, when executed by the one or more processors, cause the computing device to determine that the physical state of the user is at least one or more of:
not being coerced;
not in poor health; or
not under duress.

9. A non-transitory computer-readable medium storing instructions that, when executed, configure a computing device to:
receive a request to unlock a portion of the computing device's capabilities;

receive, via one or more inputs of the computing device, a first authentication parameter and a second authentication parameter, wherein the second authentication parameter comprises a background element;

determine, using a first machine learning model trained to identify a first baseline parameter associated with a lock condition, that the first authentication parameter matches the first baseline parameter;

determine, using the first machine learning model, a physical state of a user requesting unlocking of the portion of the computing device's capabilities;

determine, using a second machine learning model trained to identify a second baseline parameter associated with the lock condition, that the second authentication parameter matches the second baseline parameter;

determine, based on the physical state of the user, based on the first authentication parameter matching the first baseline parameter, and based on the second authentication parameter matching the second baseline parameter, that an unlock condition has been satisfied; and unlock, based on a determination that the unlock condition has been satisfied, the portion of the computing device's capabilities.

10. The non-transitory computer-readable medium of claim 9, wherein the instructions, when executed, configure the computing device to:
decrypt a storage medium associated with the computing device.

11. The non-transitory computer-readable medium of claim 9, wherein the first authentication parameter comprises a biometric identifier.

12. The non-transitory computer-readable medium of claim 11, wherein the background element comprises at least one of:
a background associated with a location;
a background image;
an ambient sound; or
an orientation of the computing device.

13. The non-transitory computer-readable medium of claim 9, wherein the instructions, when executed, configure the computing device to:
receive a lock command, wherein the lock command comprises a definition of the unlock condition.

14. The non-transitory computer-readable medium of claim 9, wherein the instructions, when executed, configure the computing device to:
determine that a first geographic location of the computing device corresponds to a second geographic location defined in the unlock condition.

15. The non-transitory computer-readable medium of claim 9, wherein the instructions, when executed, configure the computing device to determine that the unlock condition has been satisfied by determining that a current time corresponds to a time range defined in the unlock condition.

16. The computing device of claim 9, wherein the instructions, when executed by the one or more processors, cause the computing device to determine that the physical state of the user is at least one or more of:
not being coerced;
not in poor health; or
not under duress.

17. A computing device comprising:
one or more processors; and
memory storing instructions that, when executed by the one or more processors, cause the computing device to:
define a plurality of features for unlocking a portion of the computing device's capabilities;

train a machine learning model to recognize a first feature and a second feature;

define, based on training the machine learning model to recognize the first feature and the second feature, an unlock condition, wherein the unlock condition comprises authenticating the first feature and the second feature; and lock, based on defining the unlock condition, the portion of the computing device's capabilities.

18. The computing device of claim 17, wherein the instructions, when executed by the one or more processors, cause the computing device to encrypt a storage medium associated with the computing device.

19. The computing device of claim 17, wherein the first feature comprises a biometric identifier of a user.

20. The computing device of claim 19, wherein the second feature comprises at least one of:
  a background associated with a location;
  a background image;
  an ambient sound; or
  an orientation of the computing device.

21. The computing device of claim 17, wherein the defining the unlock condition comprises at least one of:
  defining a geographic location where the computing device may be unlocked; or
  defining a time range for when the computing device may be unlocked.

22. A non-transitory computer-readable medium storing instructions that, when executed, configure a computing device to:

define a plurality of features for unlocking a portion of the computing device's capabilities;

train a machine learning model to recognize a first feature and a second feature;

define, based on training the machine learning model to recognize the first feature and the second feature, an unlock condition, wherein the unlock condition comprises authenticating the first feature and the second feature; and lock, based on defining the unlock condition, the portion of the computing device's capabilities.

23. The non-transitory computer-readable medium of claim 22, wherein the instructions, when executed, configure the computing device to encrypt a storage medium associated with the computing device.

24. The non-transitory computer-readable medium of claim 22, wherein the first feature comprises a biometric identifier of a user.

25. The non-transitory computer-readable medium of claim 24, wherein the second feature comprises at least one of:
  a background associated with a location;
  a background image;
  an ambient sound; or
  an orientation of the computing device.

26. The non-transitory computer-readable medium of claim 22, wherein the defining the unlock condition comprises at least one of:
  defining a geographic location where the computing device may be unlocked; or defining a time range for when the computing device may be unlocked.

* * * * *